(12) United States Patent
Seyffert (10) Patent No.: US 6,910,587 B2
(45) Date of Patent: Jun. 28, 2005

(54) GUMBO SEPARATOR METHODS AND APPARATUSES

(75) Inventor: Kenneth W. Seyffert, Houston, TX (US)

(73) Assignee: Varco I/P, Inc., Houston, TX (US)

( * ) Notice: Subject to any disclaimer, the term of this patent is extended or adjusted under 35 U.S.C. 154(b) by 334 days.

(21) Appl. No.: 10/211,256

(22) Filed: Aug. 2, 2002

(65) Prior Publication Data

US 2004/0020841 A1 Feb. 5, 2004

(51) Int. Cl.[7] ................................................. B07B 1/10
(52) U.S. Cl. ....................... 209/307; 209/632; 209/681; 209/685; 209/234
(58) Field of Search ................................ 209/632, 665, 209/667, 674, 681, 684, 685, 234, 307

(56) References Cited

U.S. PATENT DOCUMENTS

| | | | | |
|---|---|---|---|---|
| 2,139,380 | A | * 12/1938 | Norris | 209/401 |
| 2,960,233 | A | 11/1960 | Schepman | |
| 4,350,591 | A | * 9/1982 | Lee | 210/384 |
| 4,695,015 | A | 9/1987 | Salminen | 245/6 |
| 5,041,222 | A | * 8/1991 | O'Dell | 210/386 |
| 5,921,399 | A | * 7/1999 | Bakula et al. | 209/272 |
| 5,996,387 | A | 12/1999 | Williams | 72/111 |
| 6,024,228 | A | 2/2000 | Williams | 209/272 |
| 6,036,870 | A | 3/2000 | Briant et al. | 210/781 |
| 6,105,785 | A | 8/2000 | Williams | 209/307 |
| 6,116,295 | A | 9/2000 | Williams | 140/108 |
| 6,155,428 | A | 12/2000 | Bailey et al. | 209/315 |
| 6,220,445 | B1 | * 4/2001 | Williams | 209/272 |
| 6,244,362 | B1 | 6/2001 | Williams | 175/206 |
| 6,250,476 | B1 | * 6/2001 | Kroon et al. | 209/272 |

FOREIGN PATENT DOCUMENTS

| | | | |
|---|---|---|---|
| DE | 848797 | 9/1952 | |
| DE | 24 19 751 A | 12/1975 | |
| EP | 0 915 036 A | 5/1999 | |
| WO | WO 90/13347 | 11/1990 | |
| WO | WO 93/03863 | * 3/1993 | ............ B07B/4/04 |

OTHER PUBLICATIONS

Int'l Search Report; PCT/GB03/02571; 4 pp.; Aug. 27, 2003.
Gumbo Removal Equipment, Brandt. 4 pp. 1998.
Products & Serivces, EFE Enviromental & Filtration Equip. Co., 1 pp. 2000.
Metal Belts For In Process Conveying, Screen Systems Limited, 7 pp. 2000.
Metal Belts For In Process Conveying, Screen Systems Ltd., 1 pp. 2000.

* cited by examiner

Primary Examiner—Donald P. Walsh
Assistant Examiner—Jonathan R Miller
(74) Attorney, Agent, or Firm—Guy McClung (57) ABSTRACT

A separator system for separating first material from second material, in one aspect for separating gumbo from drilling fluid, a combination of the first material and second material introducible to the separator system, the separator system having a screen conveyor having a plurality of spaced-apart rods or shafts, a plurality of wires, for each pair of adjacent rods or shafts of the plurality of spaced-apart rods or shafts a wire of the plurality of wires wrapped partially, once, or more around the rods of the pairs of spaced-apart rods, and portions of the rods and portions of the wires defining openings through which the first material is passable and through which the second material is not passable so that the screen conveyor separates the first material from the second material.

20 Claims, 9 Drawing Sheets

GUMBO SEPARATOR METHODS AND APPARATUSES

BACKGROUND OF THE INVENTION

1. Field of the Invention

The present invention is directed to separating methods, separators used in such methods, apparatuses used in such methods, and, in certain particular aspects, to methods for separating clay materials, often referred to as "gumbo," from drilling fluids.

2. Description of Related Art

The separation of solid particles from fluid streams by passing a fluid through a screening device having perforations sized so that solid particles are retained on the screen surface instead of passing through it is well-known in the prior art. Some fluid streams contain additional materials that cause solid particles to agglomerate or to adhere to each other or to a screen surface, resulting in bridging of the screen openings and blinding of the screen. Such a problem is frequently encountered in the drilling of wells during which a drilling fluid or "mud" is circulated into the wellbore.

Drilling mud is continuously circulated between the bore hole and the surface to remove drilled cuttings, also called drilled solids, from the drill bit during drilling operations. Cuttings are carried in the drilling fluid to the surface where they are separated from the fluid which is then recirculated to the drilling operation. The drilling mud is kept as clean and free of contamination by cuttings and foreign materials as possible. Drilling mud is typically cleaned by several types of equipment sequentially, including vibratory screening machines commonly referred to as "shale shakers".

During the drilling of a wellbore material of a gummy clay formation can make the separation of drilling cuttings from the drilling mud by screening operations very difficult. Gummy hydrated clay or "gumbo" adheres to the surfaces of screens and screening machines causing a buildup which can blind the screens so that the drilling mud, rather than passing through the screen where it can be recirculated, passes over and off the end of the screen where it is unrecoverable. This hydrated clay or gumbo has non-Newtonian rheological properties which contribute to these problems; e.g., it generally displays the properties of a fluid that has an increase in its viscosity with time under the influence of a suddenly applied constant shear stress and it tends to form into a cohesive mass or "gumbo patty" on screening equipment that resists separation by vibratory screening equipment because it does not readily pass through the screen openings and can not be conveyed off the screen to a waste stream because its viscosity increases as additional energy is applied by the screening machine in an attempt to transport it off the screen. This increase in viscosity results in the gumbo becoming more resistant to conveying as more energy is applied to transport it off the screen and the gumbo then tends to reduce the capacity of mud cleaning equipment to separate cuttings from drilling mud by clogging the screens and reducing their open area.

As more gumbo is removed from drilling mud during drilling, it can accumulate in screening equipment, thus the screening equipment's ability to clean the drilling mud and, in some circumstances, such an accumulation can reduce the effectiveness of or prevents the cleaning of the recirculating mud, reducing the drilling rate and increase drilling costs.

Contamination of drilling fluid can increase drilling costs significantly and reducing the capacity of mud cleaning equipment can limit the rate at which a well can be drilled, increasing the time required for drilling and increasing drilling expense. Drilling mud with gumbo in it can increase the viscosity of the mud, reducing the drilling rate and increasing costs.

Some prior art methods for dealing with gumbo during drilling have employed chemical additives to change the properties of the drilling mud, which adds cost to an already substantial drilling expense. Some prior art mechanical efforts, such as increasing the vibrational amplitude of separator devices and adding various types of water sprays have been ineffective when the gumbo forms a new steady state gumbo patty at the new operating conditions. Some attempted solutions to the gumbo problem have included applying specialized coatings to screens, e.g., as described in U.S. Pat. No. 3,963,605 (incorporated fully herein for all purposes), but such coatings can add cost to the screening equipment, and may be quickly worn off the screens by abrasive cuttings.

U.S. Pat. No. 5,921,399, incorporated fully herein for all purposes, discloses a gumbo separator comprising a vessel which is roughly rectangular, having side plates, a back plate, and an open base upon which the vessel rests. The vessel has a fluid inlet through which a fluid solution passes, a fluid outlet through which cleaned fluid passes, and a solid discharge outlet through which separated solids pass to disposal. The gumbo separator has a continuous, inclined, moving screen belt riding on and supported by a perforated backing plate to remove solids from the fluid solution and, in one embodiment, to clean expensive drilling mud. The screen belt and perforated backing plate are constructed of materials which in combination have low sliding friction and are wear resistant. A variable speed drive assembly moves the belt at a rate for removing gummy materials from drilling fluid before it can clog equipment used to remove drilling cuttings from the mud. The gumbo separator can be activated only when gumbo is encountered.

Accordingly, there remains a need in the art for apparatus to effectively remove gumbo from recirculating drilling mud. There has long been a need, recognized by the present inventor, for an efficient and effective method to separate hydrated clay from drilling fluid.

SUMMARY OF THE PRESENT INVENTION

The present invention discloses, in at least certain aspects, a separator system for separating components of a fluid, slurry or material flow, which in one aspect is useful to separate gumbo from drilling fluid, the material introducible to the separator system, the separator system having, in certain embodiments, a movable screen conveyor having screen apparatus with a plurality of spaced-apart rods, a plurality of wires, a wire of the plurality of wires wrapped around each rod of pairs of adjacent rods of the plurality of spaced-apart rods (either single or double wrapped, e.g.), the wires pivotable with respect to the rods; and portions of the rods and portions of the wires defining openings through which some component(s) of the material is/are passable and through which other component(s) (e.g., but not limited to, gumbo) is/are not passable.

Such a system has movement apparatus connected to the movable screen conveyor for moving the movable screen conveyor and, optionally, has the screen conveyor mounted in a cartridge, the cartridge removably mountable in the separator system.

In certain aspects the wires of the plurality of wires are at an angle to the rods of the plurality of spaced-apart rods and in particular aspects the angle ranges between 60 and 85 degrees. The wires may, optionally, be coated.

It is, therefore, an object of at least certain preferred embodiments of the present invention to provide:

New, useful, unique, efficient, non-obvious methods and apparatuses for separators for separating components of a fluid, slurry or material flow, and in certain particular aspects, for separating hydrated clay or gumbo from drilling fluid;

Methods that employ such new, useful, unique, efficient, non-obvious apparatuses to remove gumbo from drilling fluid.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

DESCRIPTION OF EMBODIMENTS PREFERRED AT THE TIME OF FILING FOR THIS PATENT

Figure 1A:
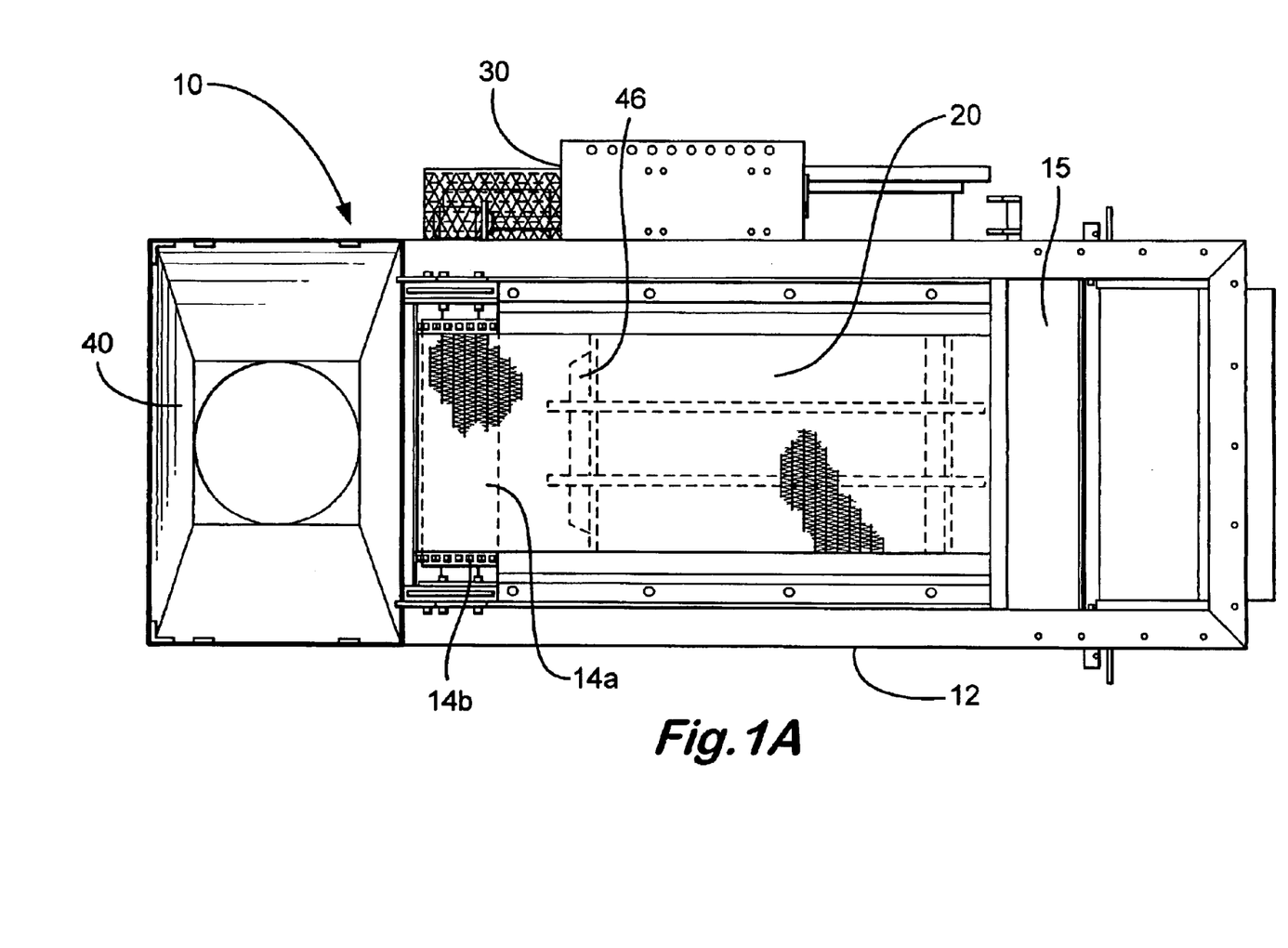
FIG. 1A is a top view and FIG. 1B is a side cross-section view of a separator according to the present invention.
Figure 1B:
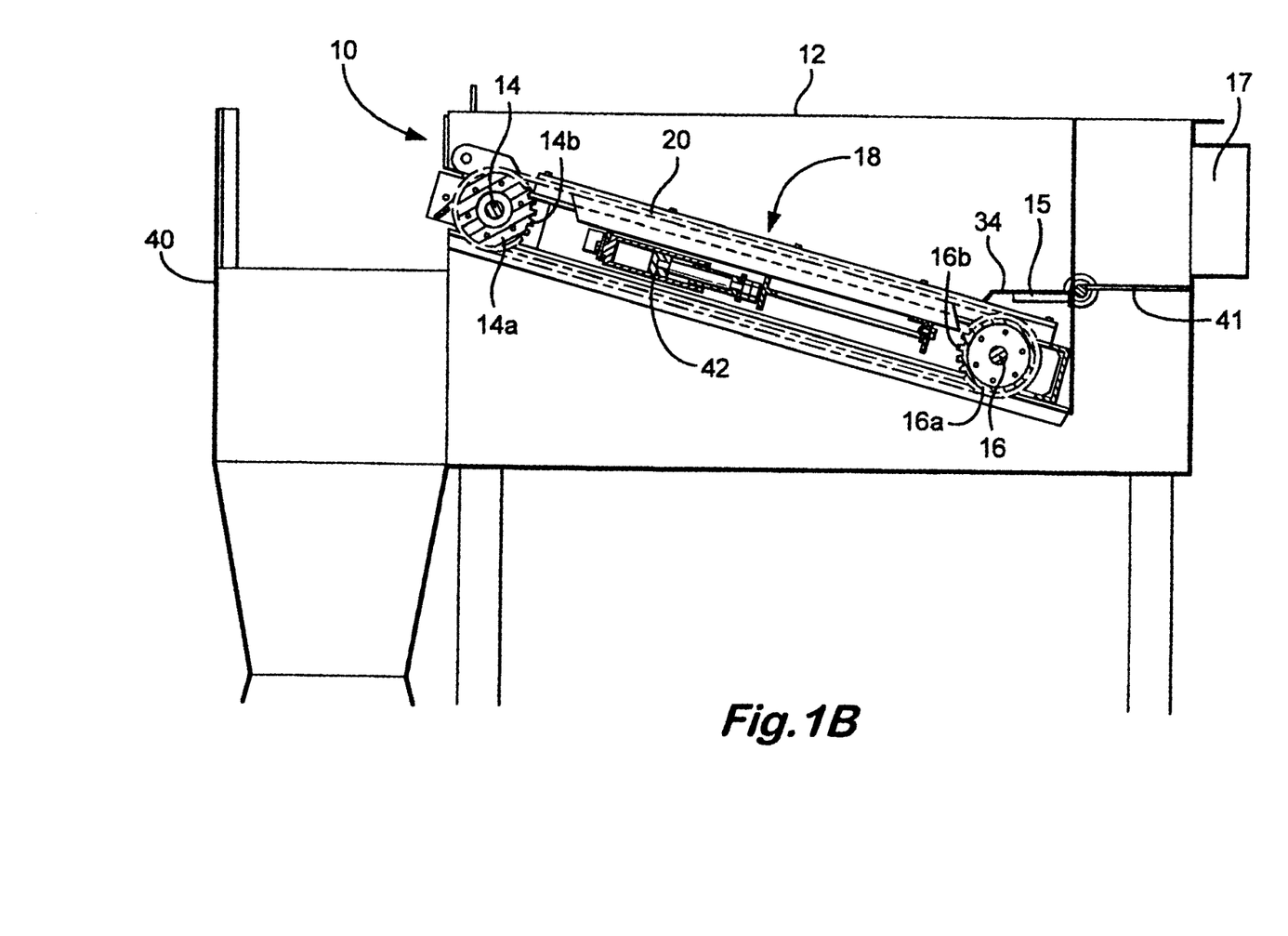

FIGS. 1A and 1B show a system 10 according to the present invention for separating materials. In one aspect such a system 10 is used to separate hydrated clay or gumbo from drilling fluid or mud during an earth wellbore drilling operation. Such a system may also be used for removing large masses or pieces from a fluid or slurry, e.g., but not limited to, large cuttings from drilling fluid, swarf from drilling fluid, pieces of cement from drilling fluid, debris from drilling fluid, or for removing gravel, ore, and/or rock from a quarry or mine slurry.

The system 10 has a housing 12 in which are mounted two rotatable shafts 14 and 16, each with two corresponding toothed wheels 14a and 16a (only one shown, FIG. 1B), respectively. Teeth 14b and 16b of the wheels 14a, 16a, respectively, project into spaces between parts of a cartridge 18 with a screen conveyor 20 which moves when one (or both) of the shafts 14, 16 and/or one or both of the wheels 14a, 16a are driven (rotated) by a motor/drive apparatus 30. As shown in FIGS. 1A and 1B, the motor apparatus 30 drives the shaft 14 which rotates the wheels 14a resulting in movement of the screen conveyor 20 (in a counterclockwise direction as viewed in FIG. 1B). A hinged diverter plate 41, when pivoted to an upright position, diverts fluid so that it bypasses the screen conveyor 20. A screen tensioner apparatus 42 with a movable piston provides for selective adjustment of the tension of the screen conveyor 20.

Figure 2A:
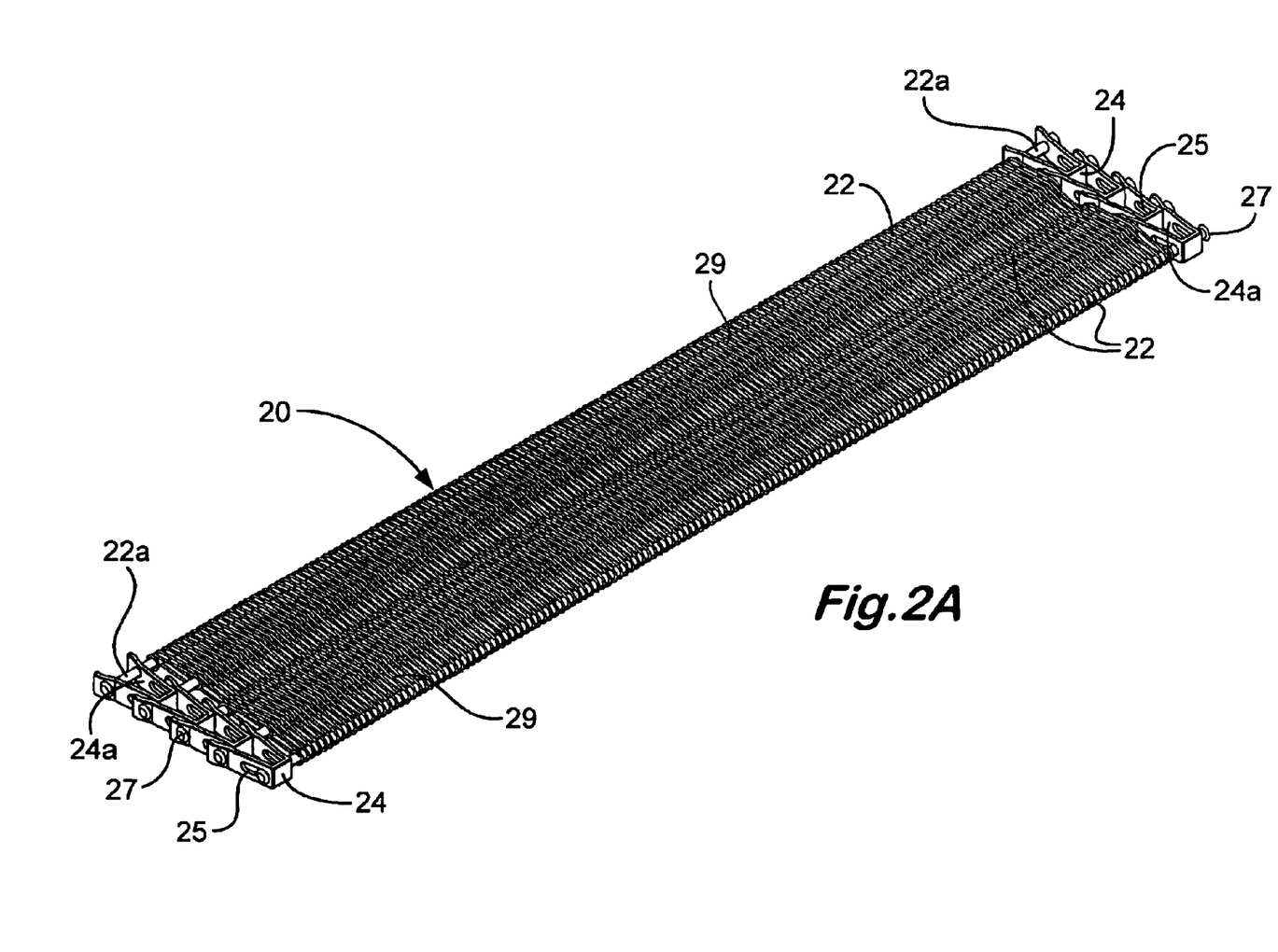
FIG. 2A is a perspective view of part of a screen conveyor of the separator of FIG. 1A.
Figure 2B:
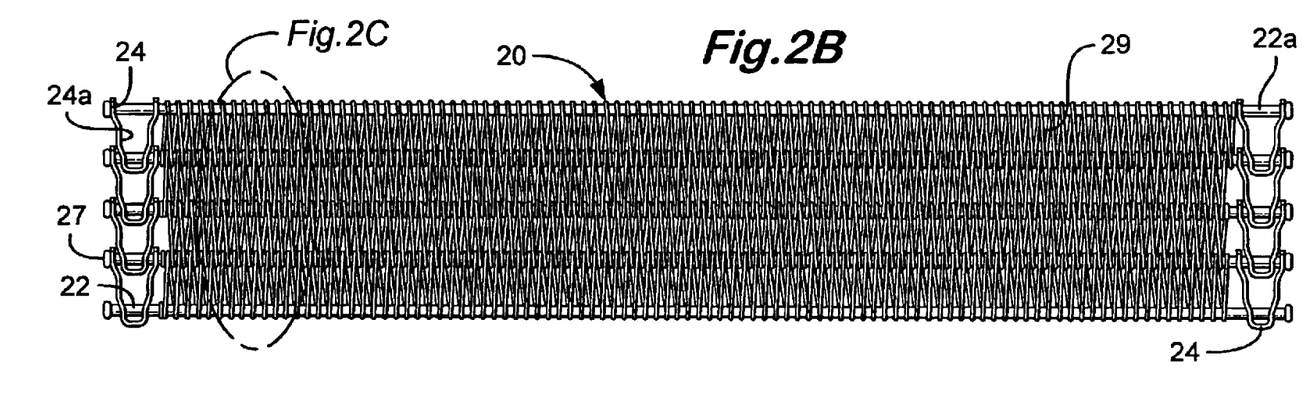
FIG. 2B is a top view of part of a screen of the screen conveyor of the separator of FIG. 1A.
Figure 2C:
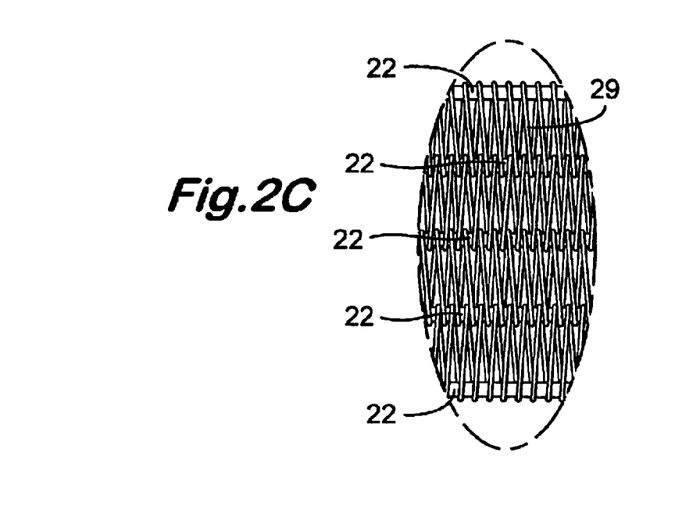
FIG. 2C is a top view of a portion of the screen of FIG. 2B.

As shown (partially) in FIGS. 2A–2C, the conveyor 20 has a series of spaced-apart rods or shafts 22 which are interconnected by end pieces 24. Each rod end 22 projects through holes 25 of two end pieces 24 interconnecting the end pieces. End members or caps 27 (removable or permanently installed) prevent the rods from escaping from the end pieces 24 once they are positioned in place. Any screen disclosed herein may have its rods or shafts connected by end pieces.

A wire or wires 29 wrap around adjacent rod pairs to form a mesh for the screen conveyor 20. The teeth 14b, 16b of the wheels 14a, 16a are releasably received in openings 24a defined by portions of the end pieces 24. As shown in FIG. 2C, wires 20 "double wrap" the rods 22. The rod ends 22a provide shafts on which the end pieces 24 can pivot and the rod bodies provide shafts on which portions of the wires 29 can pivot, thus rendering the screen conveyor flexible so that it can be moved around and with respect to the wheels 14, 16. The wires 29 extend between the rods 22 on two sides thereof due to the "double wrap" configuration so that, as viewed from the side there are wire portions on both the top and on the bottom of the rods 22.

In the system 10, FIGS. 1A and 1B, with a screen conveyor 20 with screen as in FIGS. 2A–2C, material to be treated (e.g., but not limited to, drilling mud with debris, gumbo, etc., therein) flows through an inlet 17, over a plate 15, and onto the moving screen conveyor 20. Optionally, a piece of flexible material 34 (see FIG. 3A, e.g. rubber, fiberglass, or plastic) extends from the plate 15 to a point above the screen conveyor 20 to prevent material from falling down beneath the plate 15. Separated solids move off the upper end of the screen conveyor 20 into a collection hopper 40 from which they may be transported or fed to storage, disposal, or additional processing.

In one particular embodiment, the wires 29 of the screen conveyor 20 are stainless steel wire between 14 to 16 gauge in cross-sectional diameter and each shaft 22 has about 60 spaced-apart wraps of wire per foot of shaft length. This produces openings between adjacent wire portions that are approximately 5/32" wide and about 1" long. Any desired length and width may be used. Multiple openings formed by successive wire wraps around the shaft and defined by portions of wire 29 and portions of rod 22 are substantially parallel to each other and substantially quadrangular. As shown, e.g. in FIGS. 2A–2C, the wires are at an angle to the shafts 22. According to certain embodiments of the present invention this angle may range between 60 and 85 degrees. In certain embodiments the wires and/or rods or shafts of screens according to the present invention are made of steel, stainless steel, aluminum, aluminum alloy, bronze, brass, zinc, zinc alloy, composite material, or fiberglass.

FIGS. 3A–3E show a cartridge 50 (like the cartridge 18, FIG. 1A) with a screen conveyor 20 according to the present invention.

Figure 3A:
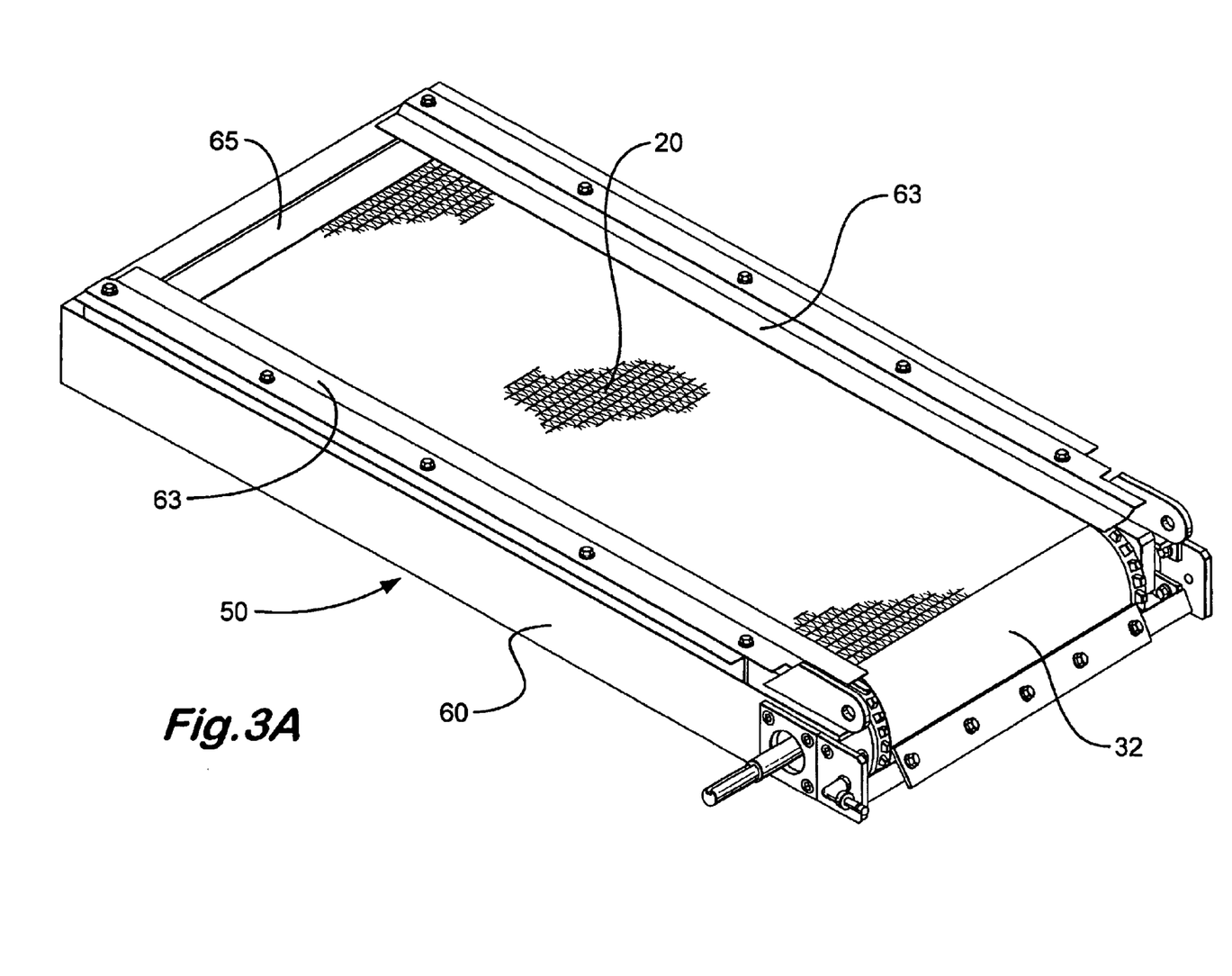
FIG. 3A is a perspective view of the separator of FIG. 1A.
Figure 3B:
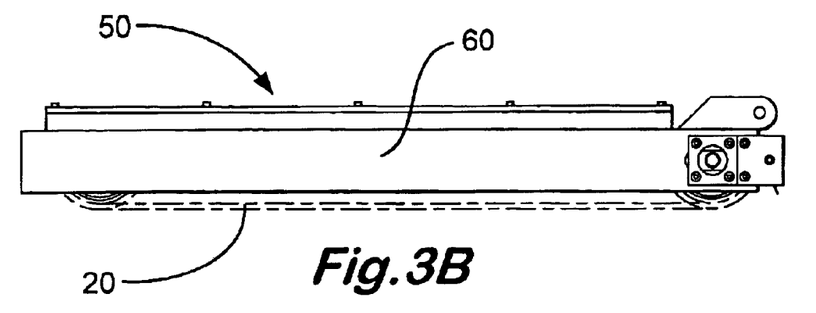
FIG. 3B is a side view of the screen conveyor of FIG. 3A.
Figure 3C:
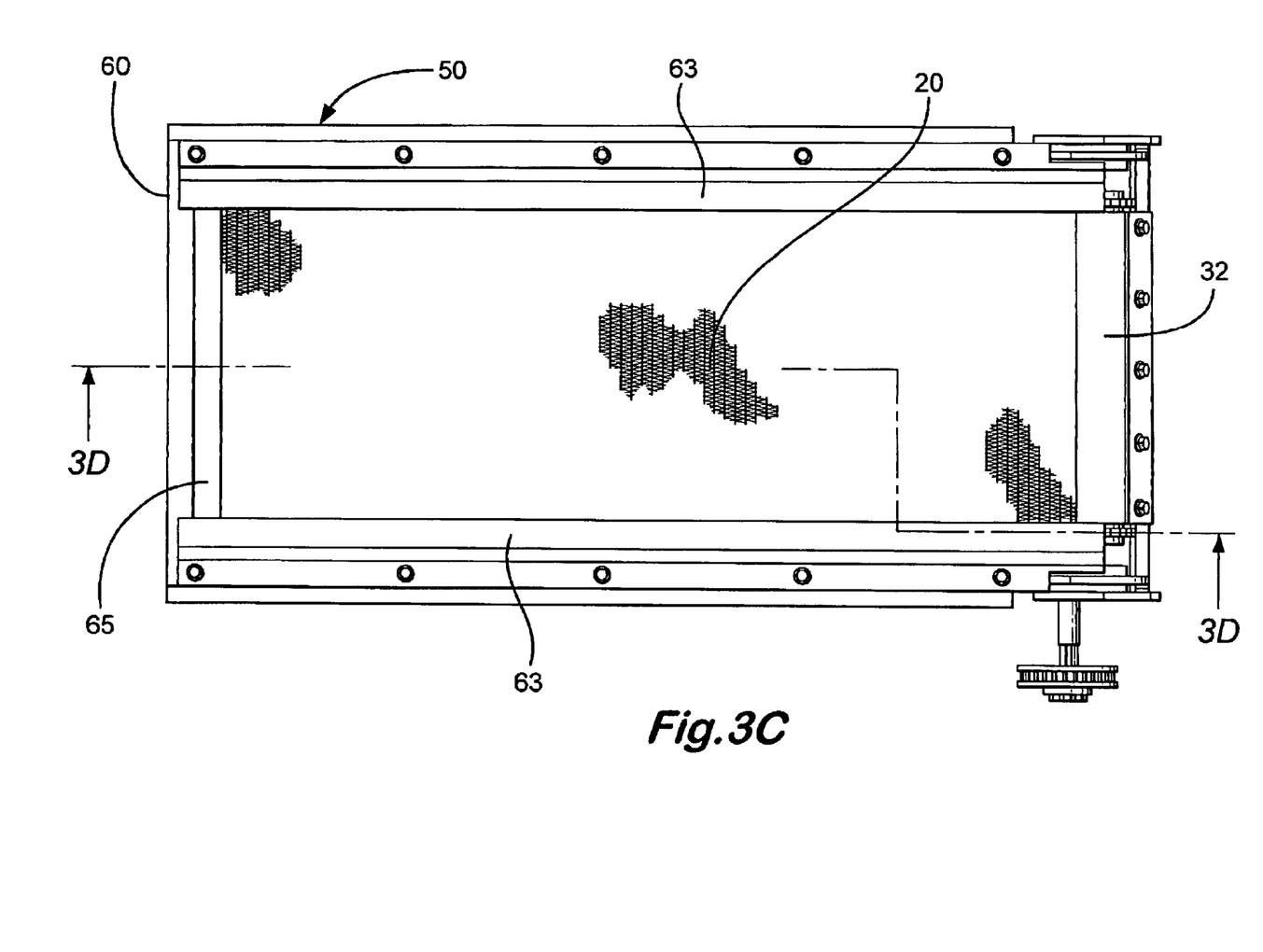
FIG. 3C is a top view of part of the screen conveyor of FIG. 3A.
Figure 3D:
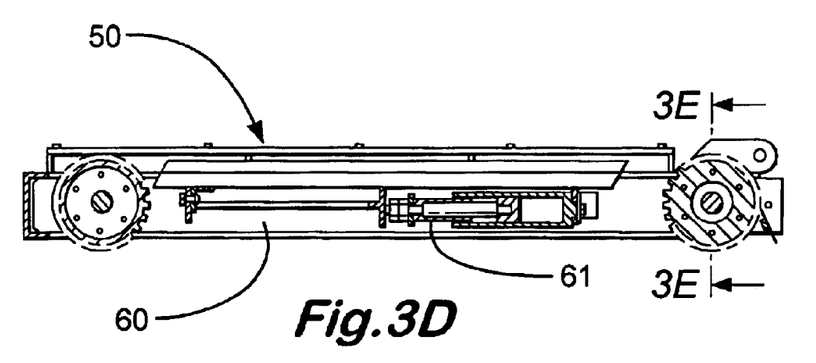
FIG. 3D is a cross-section view of part of the screen conveyor of FIG. 3A along line 3D—3D of FIG. 3C.
Figure 3E:
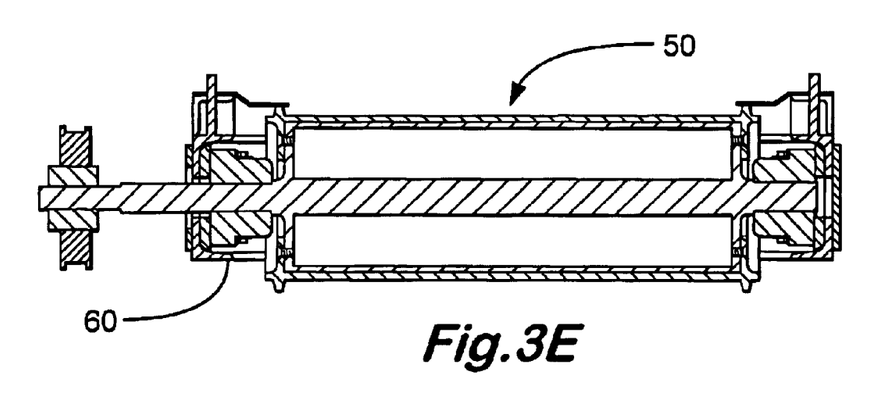
FIG. 3E is a cross-section view along line 3E—3E of FIG. 3D.

The cartridge 50 mounted to a frame 60 which can be inserted into a housing (e.g. like the housing 12, FIG. 1A) and then removed for repair or replacement. A splash plate 32 removably bolted to frame 60 at an exit end of the cartridge 50 facilitates discharge of separated solids into a collection area or hopper. Side guards 63 removably bolted to the frame 60 prevent separated solids from falling down around the sides of the screen conveyor 20. The plate 32 and the sideguards 63 may be made of any suitable metal, plastic or other material and, in one aspect, are made of polyurethane. An end guard 65 at a material introduction end of the cartridge 50 facilitates movement of material onto the screen conveyor 20 and prevents material from falling down past the end of the screen conveyor 20. In one aspect the end guard 65 is flexible to permit access to the end of the screen conveyor 20 and the adjacent area. A tensioner 61 (like the apparatus 42 of FIG. 1B) provides selective tensioning of the screen conveyor 20.

Figure 4:
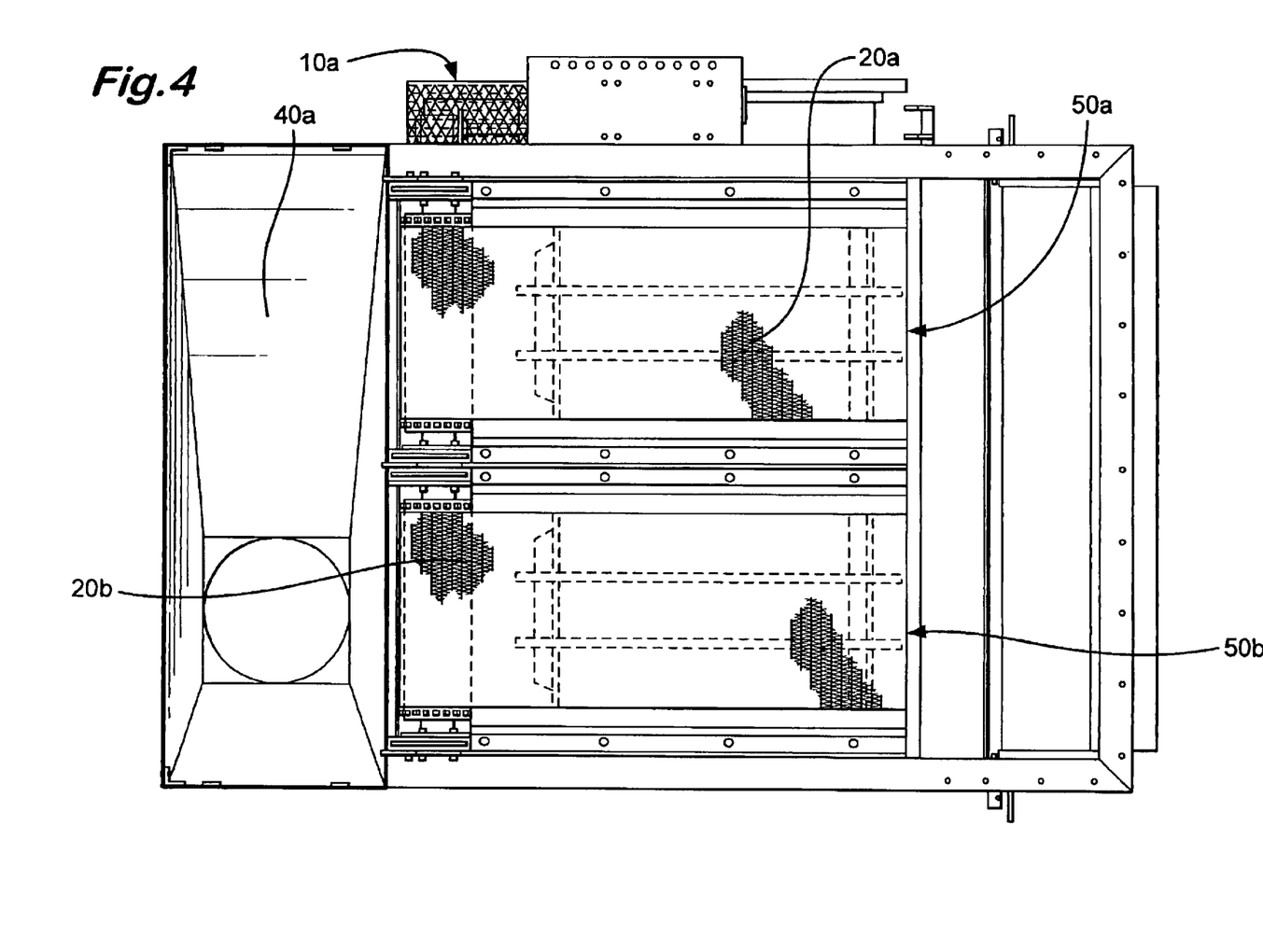
FIG. 4 is a top view of a separator according to the present invention.

FIG. 4 shows a dual cartridge system 10a which is like the system 10, FIG. 1A (and like numerals indicate like parts). The system 10a has two cartridges 50a and 50b (like the cartridge 50, FIG. 3A) each with a screen conveyor 20a and 20b, respectively (like the conveyor 20 described above).

Figures 2D, 2E, 2F:
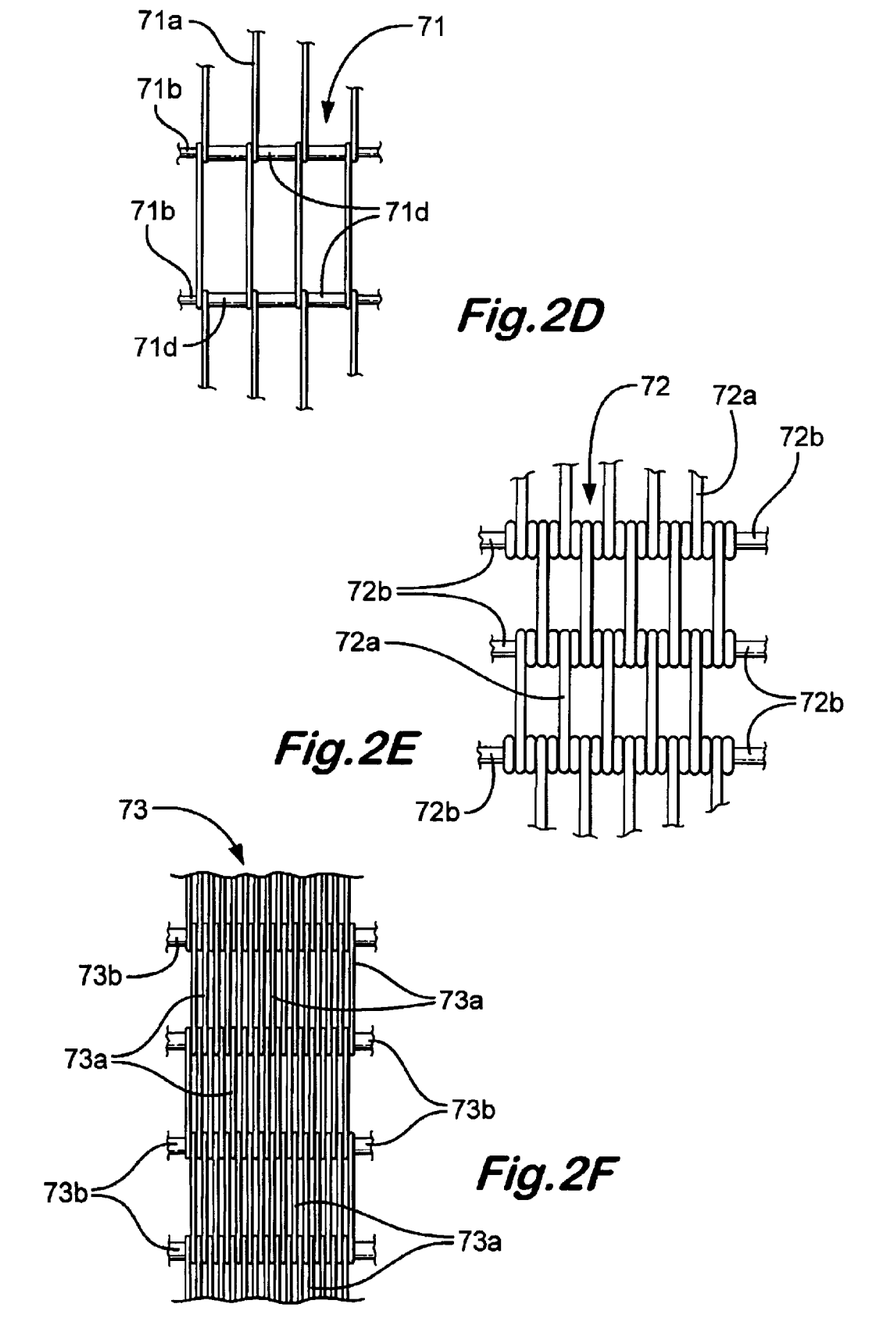
FIGS. 2D–2F are top views of single-wrap screen for use with screen conveyors and separators according to the present invention.

FIGS. 2D–2F show embodiments of screens 71, 72 and 73, respectively, which may be used on screen conveyors according to the present invention instead of the "double wrap" screen of FIGS. 2A–2C. Each of the screens 71, 72 and 73 is a "single wrap" screen, i.e., the wires 71a, 72a, and 73a respectively, of the screens wrap around shafts 71b, 72b and 73b, respectively, so that the wire portions extending between the rods are only on one side thereof and, in one embodiment, that side is the top of the screen of a screen conveyor. The screen 71 has spacers 71d around shafts 71b between wires 71a to maintain desired spacing between wires (and such spacers may be used in any screen disclosed herein). Such spacers are made, e.g., of hollow metal, plastic, composite, fiberglass, steel, stainless steel or of masses of such material emplaced around portions of the wire shafts or rods. The ends of wires 72a are wrapped slightly more than completely around its shafts 72b which provides spacing between adjacent wires and also provides a strong attachment of the wires to the shafts 72b. Any wire piece for any screen herein may have an end that is wrapped completely around a rod or shaft once, twice, thrice or more times.

Figures 2G, 2H:
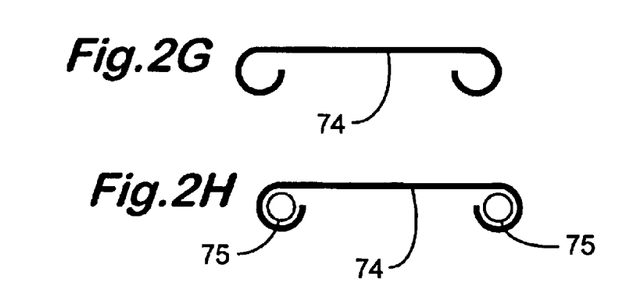
FIG. 2G is a side view of a piece of single wrapwire used on a screen for use in methods according to the present invention.
FIG. 2H is a side view showing the wire of FIG. 2G on adjacent rods of a screen.
Figure 2I:
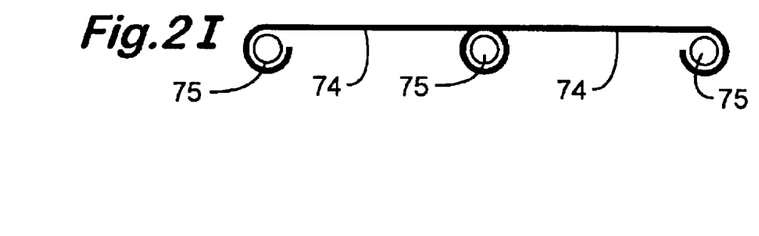
FIG. 2I is a side view showing two pieces of wire like that of FIG. 2I on adjacent rods of a screen.

FIG. 2G shows a typical piece of wire 74 useful in "single wrap" screens for use in embodiments of the present invention. FIG. 2H shows the wire 74 in place with respect to two screen shafts 75. FIG. 2I shows two wires 74 in place with respect to three shafts 75. Any wire or screen disclosed herein may be coated with plastic, epoxy, fiberglass, or with polytetrafluoroethylene.

The present invention, therefore, in at least certain embodiments, provides a separator system for separating materials, and, in one aspect for separating gumbo from drilling fluid, the materials introducible to the separator system, the separator system having a movable screen conveyor having screen apparatus with a plurality of spaced-apart rods, a plurality of wires, a wire of the plurality of wires wrapped around each rod of pairs of adjacent rods of the plurality of spaced-apart rods, the wires pivotable with respect to the rods, and portions of the rods and portions of the wires defining openings through which the drilling fluid is passable and through which the material is not passable so that the movable screen conveyor can separate the material from the drilling fluid. Such a system may have one or some, in any possible combination, of the following: movement apparatus connected to the movable screen conveyor for moving the movable screen conveyor; wherein each of the plurality of wires is single-wrapped or double-wrapped around rods of a pair of adjacent rods of the plurality of spaced-apart rods; wherein the screen conveyor is mounted in a cartridge, the cartridge removably mounted in the separator system; wherein the wires of the plurality of wires are at an angle to the rods of the plurality of spaced-apart rods; wherein the angle ranges between 60 and 85 degrees; wherein the material includes material that is from the group consisting of gumbo, gravel, ore, rock, cement, debris, swarf, and drilled cuttings; wherein the wires of the plurality of spaced-apart wires are coated; wherein the coating is from the group consisting of plastic, fiberglass, epoxy, and polytetrafluoroethylene; two spaced-apart movable toothed wheels for moving the screen conveyor, the screen conveyor mounted on the two spaced-apart movable toothed wheels and having open end pieces for receiving teeth of the two spaced-apart movable toothed wheels; a plurality of end pieces, ends of each pair of rods of the plurality of spaced-apart rods connected by an end piece of the plurality of end pieces; wherein the rods of the plurality of spaced-apart rods are between 14 to 16 gauge in outer diameter; wherein portions of the wires of the plurality of wires define openings of the screen conveyor which are about 1" long; wherein each rod of the plurality of spaced-apart rods has about sixty spaced-apart wraps of wire of the plurality of wires per foot of rod; wherein portions of wires of the plurality of wires define openings of the screen conveyor which are substantially parallel to each other; and/or wherein the wires of the plurality of wires are made from material from the group consisting of steel, stainless steel, aluminum, aluminum alloy, bronze, brass, zinc, zinc alloy, composite material, or fiberglass.

The present invention, therefore, provides in at least certain embodiments, a separator system for separating material from drilling fluid, the separator system having a movable screen conveyor having screen apparatus with a plurality of spaced-apart rods; a plurality of wires, a wire of the plurality of wires wrapped around each rod of pairs of adjacent rods of the plurality of spaced-apart rods, the wires pivotable with respect to the rods; portions of the rods and portions of the wires defining openings through which the drilling fluid is passable and through which the material is not passable so that the movable screen conveyor can separate the material from the drilling fluid; movement apparatus connected to the movable screen conveyor for moving the movable screen conveyor; wherein the screen conveyor is mounted in a cartridge, the cartridge removably mountable in the separator system; wherein the wires of the plurality of wires are at an angle to the rods of the plurality of spaced-apart rods; wherein the angle ranges between 60 and 85 degrees; a plurality of end pieces, ends of each pair of rods of the plurality of spaced-apart rods connected by an end piece of the plurality of end pieces; wherein portions of wires of the plurality of wires define openings of the screen conveyor which are substantially parallel to each other; and wherein the wires of the plurality of wires are made from material from the group consisting of steel, stainless steel, aluminum, aluminum alloy, bronze, brass, zinc, zinc alloy, composite material, or fiberglass.

The present invention, therefore, provides a method for separating material from drilling fluid, the method including introducing drilling fluid with the material therein to a separator system according to the present invention as disclosed herein, and separating the material from the drilling fluid with the separator system.

What is claimed is:

1. A separator system for separating gumbo from drilling fluid, the separator system comprising
   a movable screen conveyor having a screen apparatus with a plurality of rods, the rods comprising spaced-apart straight rods,
   a plurality of end pieces, each end piece connected to an end of each of two adjacent rods,
   a plurality of wires, a wire of the plurality of wires wrapped around each rod of pairs of adjacent rods of the plurality of spaced-apart rods, the wires pivotable with respect to the rods,
   portions of the rods and portions of the wires defining openings through which the drilling fluid is passable and through which the gumbo is not passable so that the movable screen conveyor can separate the gumbo from the drilling fluid,
   movement apparatus connected to the movable screen conveyor for moving the movable screen conveyor,
   wherein the screen conveyor is mounted in a cartridge, the cartridge removably mountable in the separator system,
   wherein the wires of the plurality of wires are at an angle to the rods of the plurality of spaced-apart rods,
   wherein the angle ranges between 60 and 85 degrees,
   a plurality of end pieces, ends of each pair of rods of the plurality of spaced-apart rods connected, by an end piece of the plurality of end pieces,
   wherein portions of wires of the plurality of wires define openings of the screen conveyor which are substantially parallel to each other, and
   wherein the wires of the plurality of wires are made from material from the group consisting of steel, stainless steel, aluminum, aluminum alloy, bronze, brass, zinc, zinc alloy, composite material, and fiberglass.

2. A separator system for separating material from drilling fluid, a combination of the material and the drilling fluid introducible to the separator system, the separator system comprising
   a movable screen conveyor having a screen apparatus with a plurality of rods, the rods comprising spaced-apart straight rods,
   a plurality of end pieces, each end piece connected to an end of each of two adjacent rods,
   a plurality of wires, a wire of the plurality of wires wrapped around each rod of pairs of adjacent rods of the plurality of spaced-apart rods, the wires pivotable with respect to the rods, and
   portions of the rods and portions of the wires defining openings through which the drilling fluid is passable and through which the material is not passable so that the movable screen conveyor can separate the material from the drilling fluid,
   the wires of the plurality of wires at an angle to the rods of the plurality of spaced-apart rods, the angle ranging between 60 and 85 degrees.

3. The separator system of claim 2 further comprising movement apparatus connected to the movable screen conveyor for moving the movable screen conveyor.

4. The separator system of claim 2 wherein each of the plurality of wires is single-wrapped around rods of a pair of adjacent rods of the plurality of spaced-apart rods.

5. The separator system of claim 2 wherein each of the plurality of wires is double-wrapped around rods of a pair of adjacent rods of the plurality of spaced-apart rods.

6. The separator system of claim 2 wherein the screen conveyor is mounted in a cartridge, the cartridge removably mounted in the separator system.

7. The separator system of claim 2 wherein the material is from the group consisting of gumbo, cement, debris, swarf, and drilled cuttings.

8. The separator system of claim 2 wherein the wires of the plurality of spaced-apart wires are coated.

9. The separator system of claim 8 wherein the coating is from the group consisting of plastic, fiberglass, epoxy, and polytetrafluoroethylene.

10. The separator system of claim 2 further comprising
    two spaced-apart movable toothed wheels for moving the screen conveyor,
    the screen conveyor mounted on the two spaced-apart movable toothed wheels and having open end pieces for receiving teeth of the two spaced-apart movable toothed wheels.

11. The separator system of claim 2 further comprising
    a plurality of end pieces, ends of each pair of rods of the plurality of spaced-apart rods connected by an end piece of the plurality of end pieces.

12. The separator system of claim 2 wherein the rods of the plurality of spaced-apart rods are between 14 to 16 gauge in outer diameter.

13. The separator system of claim 2 wherein portions of the wires of the plurality of wires define openings of the screen conveyor which are about 1" long.

14. The separator system of claim 2 wherein each rod of the plurality of spaced-apart rods has about sixty spaced-apart wraps of wire of the plurality of wires per foot of rod.

15. The separator system of claim 2 wherein portions of wires of the plurality of wires define openings of the screen conveyor which are substantially parallel to each other.

16. The separator system of claim 2 wherein the wires of the plurality of wires are made from material from the group consisting of steel, stainless steel, aluminum, aluminum alloy, bronze, brass, zinc, zinc alloy, composite material, and fiberglass.

17. A separator system for separating material from drilling fluid, a combination of the material and the drilling fluid introducible to the separator system, the separator system comprising
    a movable screen conveyor having a screen apparatus with a plurality of rods, the rods comprising spaced-apart straight rods,
    a plurality of end pieces, each end piece connected to an end of each of two adjacent rods,
    a plurality of wires, a wire of the plurality of wires wrapped around each rod of pairs of adjacent rods of the plurality of spaced-apart rods, the wires pivotable with respect to the rods, and portions of the rods and portions of the wires defining openings through which the drilling fluid is passable and through which the material is not passable so that the movable screen conveyor can separate the material from the drilling fluid, two spaced-apart movable toothed wheels for moving the screen conveyor, and the screen conveyor mounted on the two spaced-apart movable toothed wheels and having open end pieces for receiving teeth of the two spaced-apart movable toothed wheels.

18. The separator system of claim 17 further comprising movement apparatus connected to the movable screen conveyor for moving the movable screen conveyor.

19. The separator system of claim 17 wherein the screen conveyor is mounted in a cartridge, the cartridge removably mounted in the separator system.

20. The separator system of claim 17 wherein the material is from the group consisting of gumbo, cement, debris, swarf, and drilled cuttings.

* * * * *